US012625883B2

(12) United States Patent
Helland

(10) Patent No.: US 12,625,883 B2
(45) Date of Patent: May 12, 2026

(54) QUORUM-BASED SCALABLE DATABASE SYSTEM

(71) Applicant: Salesforce, Inc., San Francisco, CA (US)

(72) Inventor: Patrick James Helland, San Rafael, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/779,287

(22) Filed: Jul. 22, 2024

(65) Prior Publication Data

US 2025/0036654 A1    Jan. 30, 2025

Related U.S. Application Data

(60) Provisional application No. 63/515,792, filed on Jul. 26, 2023, provisional application No. 63/515,791, filed on Jul. 26, 2023.

(51) Int. Cl.
| | |
|---|---|
| *G06F 16/27* | (2019.01) |
| *G06F 16/22* | (2019.01) |
| *G06F 16/23* | (2019.01) |
| *G06F 16/2455* | (2019.01) |

(52) U.S. Cl.
CPC ........ *G06F 16/278* (2019.01); *G06F 16/2246* (2019.01); *G06F 16/2365* (2019.01); *G06F 16/24552* (2019.01)

(58) Field of Classification Search
CPC ............. G06F 16/2246; G06F 16/2343; G06F 16/2365; G06F 16/24552; G06F 16/278
See application file for complete search history.

(56) References Cited

U.S. PATENT DOCUMENTS

| | | | | |
|---|---|---|---|---|
| 5,872,981 A * | 2/1999 | Waddington | .............. | G06F 9/52 710/200 |
| 9,372,870 B1 * | 6/2016 | Levy | ................... | H04L 67/1001 |
| 9,489,434 B1 * | 11/2016 | Rath | ....................... | G06F 11/14 |
| 11,494,356 B2 | 11/2022 | Helland | | |
| 11,822,535 B2 | 11/2023 | Helland | | |

(Continued)

OTHER PUBLICATIONS

International Search Report and Written Opinion on PCT Appl. No. PCT/US2024/038966 mailed Oct. 9, 2024, 15 pages.

*Primary Examiner* — James E Richardson

(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to a database system. The database system includes multiple coordinator nodes storing replicas of a partition. Each partition describes the state of locks and transactions for keys covered by that partition of keys. Each partition is, in turn, replicated. The multiple coordinator nodes receive, from multiple worker nodes, requests to grant a lock for a key to permit a worker node to write a record for the key as part of executing a transaction. A given coordinator node of the multiple coordinator nodes sends an approval response for the lock to at most one of the worker nodes. A single worker node acquires the lock in response to receiving approval responses from a majority of the multiple coordinator nodes, and none of the multiple worker nodes acquire the lock in response to none of them receiving approval responses from a majority of the multiple coordinator nodes.

18 Claims, 8 Drawing Sheets

(56)          References Cited

U.S. PATENT DOCUMENTS

| | | | |
|---|---|---|---|
| 2007/0156842 A1* | 7/2007 | Vermeulen | H04L 67/00 |
| | | | 709/217 |
| 2007/0239797 A1 | 10/2007 | Cattell et al. | |
| 2015/0370795 A1* | 12/2015 | Ransil | G06F 16/245 |
| | | | 707/741 |
| 2019/0213203 A1 | 7/2019 | Lee et al. | |
| 2020/0034373 A1* | 1/2020 | Lee | G06F 16/2365 |
| 2020/0228393 A1* | 7/2020 | Rath | G06F 3/0683 |
| 2021/0209092 A1* | 7/2021 | Lee | G06F 16/2365 |
| 2022/0129445 A1 | 4/2022 | Helland | |
| 2022/0360627 A1* | 11/2022 | Vermeulen | G06F 9/547 |
| 2022/0391376 A1 | 12/2022 | Helland | |
| 2023/0230098 A1* | 7/2023 | Burnett | G06Q 20/401 |
| | | | 707/703 |
| 2024/0378191 A1* | 11/2024 | Bhola | G06F 16/2322 |

* cited by examiner

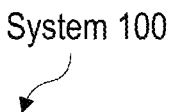
System 100
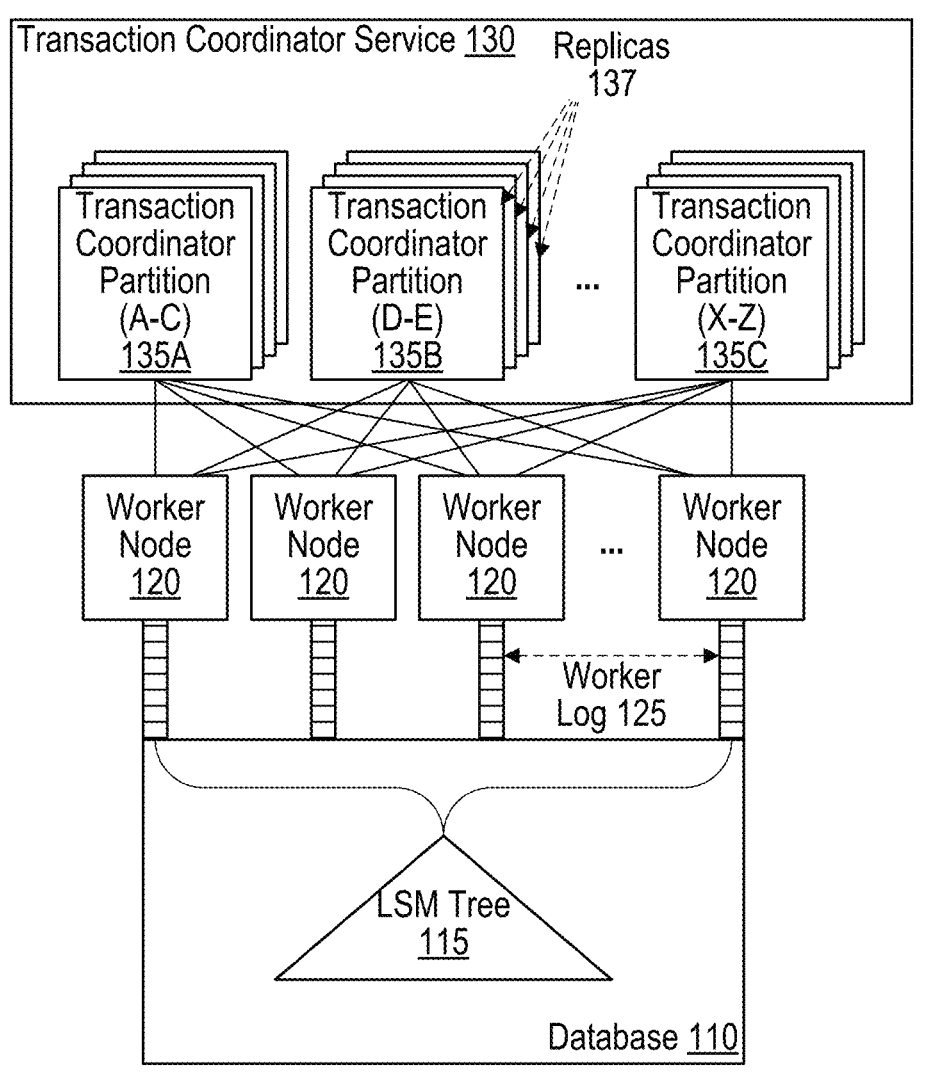
FIG. 1

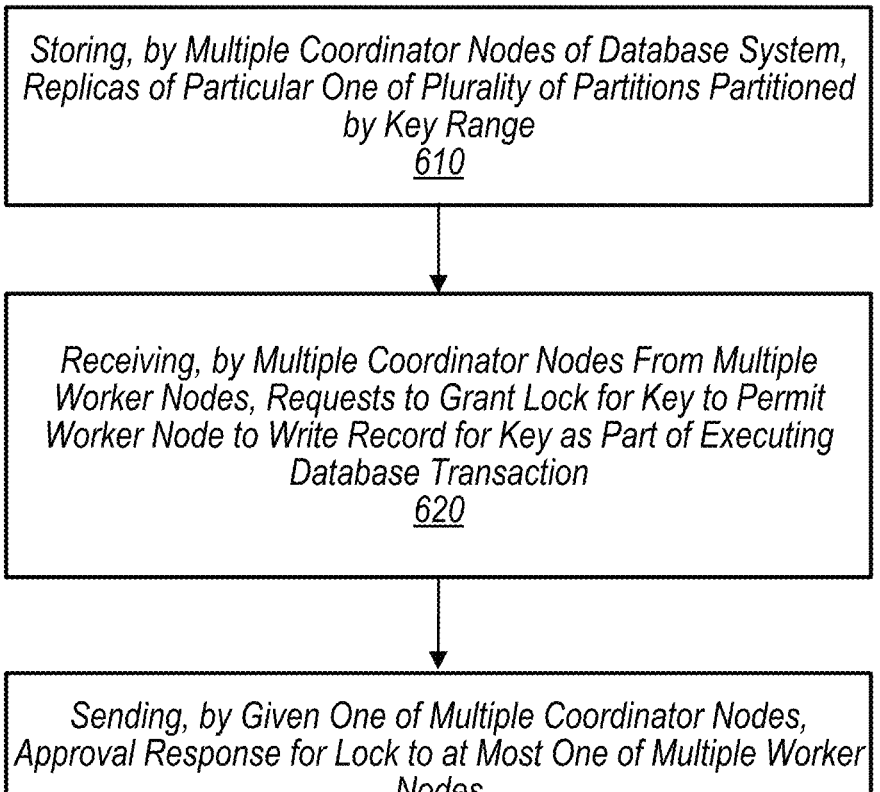

600

Storing, by Multiple Coordinator Nodes of Database System,
Replicas of Particular One of Plurality of Partitions Partitioned
by Key Range
610

Receiving, by Multiple Coordinator Nodes From Multiple
Worker Nodes, Requests to Grant Lock for Key to Permit
Worker Node to Write Record for Key as Part of Executing
Database Transaction
620

Sending, by Given One of Multiple Coordinator Nodes,
Approval Response for Lock to at Most One of Multiple Worker
Nodes
630

FIG. 6

QUORUM-BASED SCALABLE DATABASE SYSTEM

PRIORITY CLAIM

The present application claims priority to U.S. Provisional Appl. No. 63/515,791, filed Jul. 26, 2023, and U.S. Provisional Appl. No. 63/515,792, filed Jul. 26, 2023, which are incorporated by reference herein in their entirety.

BACKGROUND

Technical Field

This disclosure relates generally to database systems and, more specifically, to various mechanisms for implementing a quorum-based scalable database system.

Description of the Related Art

Modern database systems routinely implement management systems that enable users to store a collection of information in an organized manner that can be efficiently accessed and manipulated. In some cases, these management systems maintain a log-structured merge-tree (LSM tree) comprising multiple levels that each store information in database records as key-value pairs. A database system can include a persistent storage that houses the LSM tree and a database node having an in-memory buffer. During operation, the database node initially writes records into the in-memory buffer before later flushing them to the persistent storage. As a part of flushing the records, the database node writes them to new files that are stored in one of the many levels of the LSM tree. Over time, the records are rewritten into new files stored in lower levels as the records are moved down the LSM tree.

BRIEF DESCRIPTION OF THE DRAWINGS

FIG. 1 is a block diagram illustrating example elements of a system that has a database, worker nodes, and a transaction coordinator service, according to some embodiments.

FIG. 6 is a flow diagram illustrating an example method relating to coordinator nodes ensuring transactional consistency for transactions performed by worker nodes, according to some embodiments.

DETAILED DESCRIPTION

Figure 2A:
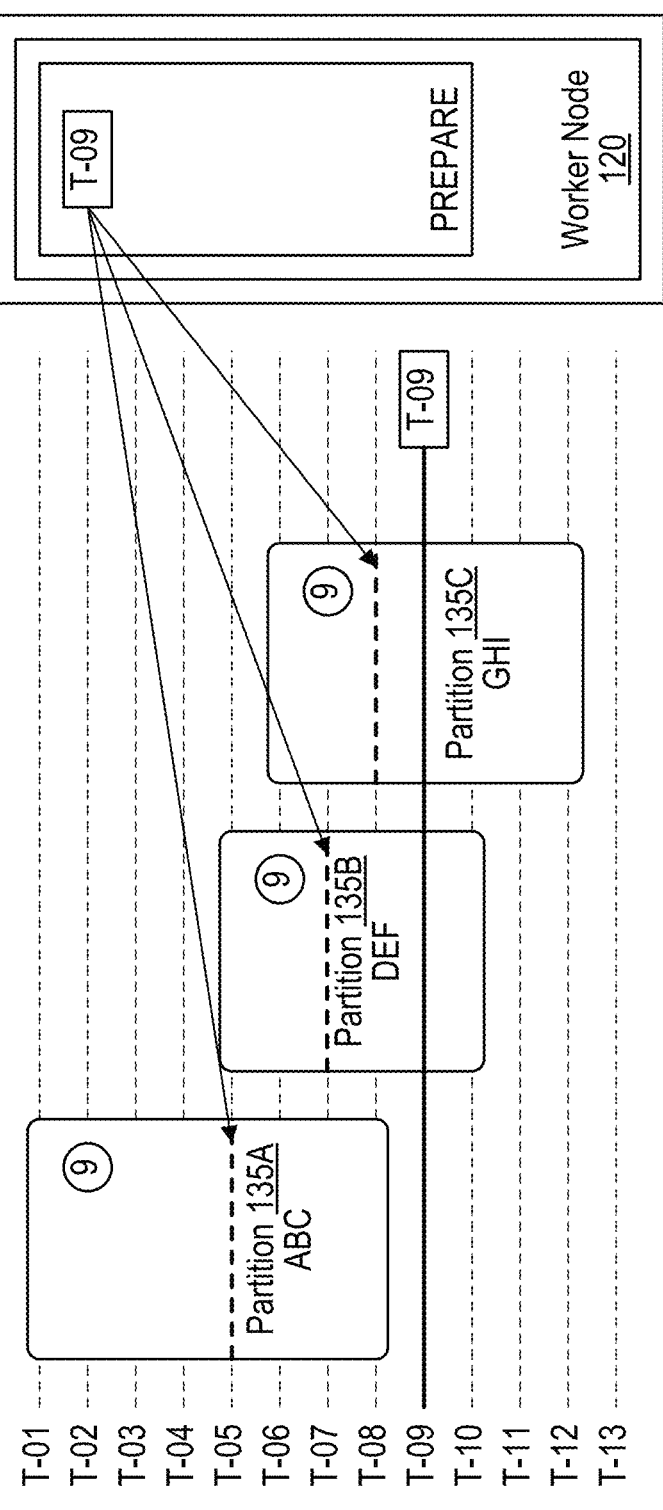
FIGS. 2A and 2B are block diagrams illustrating an example in which a request affecting partitions is processed at a time provided by a worker node, according to some embodiments.

Many database systems process transactions according to certain guarantees that ensure transactional consistency.

Read committed snapshot isolation (RCSI) is one example. RCSI is a guarantee that all reads made in a transaction will see a consistent snapshot of the database system, and the transaction will successfully commit only if the updates it made do not conflict with any concurrent updates made since that snapshot. In particular, a transaction can contain one or more database statements and, in RCSI, the transaction can be performed one statement at a time. Each statement acquires a snapshot time to use as it reads, locks, and updates records; the transaction can read records that were committed as—of the snapshot time. If the statement performs updates, then the database system ensures that the record being updated has not been modified since the snapshot time of that statement—a transaction can acquire a snapshot time at the transaction level, and thus the database system can ensure that the records being updated have not been modified since the snapshot time of the transaction when the transaction is being committed.

Abiding by RCSI leads to scaling limitations on a database system that are inherent in the characteristics of RCSI. For example, if multiple transactions attempt to write a record for the same database key at relatively the same time, those transactions can block each other. As an example, one of the transactions may acquire a lock on the key (so that it can write a record for that key) that prevents the other transactions from acquiring a lock on that key. As another example, in the event of a conflicting update, a transaction can experience a rollback in which all changes made within a statement of the transaction are undone back to the beginning of that statement. Accordingly, a transaction can be stalled and/or at least partially rolled back under certain circumstances. If these circumstances happen rarely even under scale, then a database system may be scaled up to a significant size—that is, if transactions do not fight to update the same records, then there may be no limitations imposed by RCSI on database scaling.

But while RCSI may impose database scaling limitations on a database system, modern database system implementations that support RCSI have artificial scaling limitations resulting from design choices. Today's implementations of database systems that support RCSI (with multi-version concurrency control (MVCC)) may be classified under three archetypes: single-writer, shared-writer, and partitioned-writer. MVCC is an approach in which a database system store multiple versions of a record. In typical popular implementations of MVCC, the current version has a "home" location holding the most recently committed version of the record or perhaps an uncommitted version. A record's home may be a server, a data structure (e.g., B+ tree), and/or a block. Updating a record happens by first moving any older versions of the record elsewhere and recording where it may be found. Then, the new version for the committed (or pending) new version of the record is stored at the home.) In a single-writer database system, record changes flow from a single primary server that is usually supported by secondary servers that execute read-only transactions. In a shared-writer database system, there are multiple primary servers that produce record changes. In a partitioned-writer database system, the database is split into partitions, each of which can be updated by only one primary server.

These archetypes have limitations on database scaling. Modern single-writer database systems do not scale well since they rely on a single primary server to make updates to records. Modern shared-writer database systems do not scale well since multiple servers must fight over coordination data structures to make changes to a record. That is, to update a particular record, exclusive access to that record's home (e.g., B+ tree) must be acquired by a transaction. This causes infighting, contention, and coordination between the updating and reading transactions. Further, reading transactions often have to search the locations of older versions of a record, which requires coordinated access. Modern partitioned-writer database systems do not scale well since write traffic to the database systems may not match the partitioning of the keys being written—the partitions become "hot" and cause performance problems. Moving record keys from one partition to another is complex and impacts application availability. Accordingly, the partitioned-writer database systems are not able to adapt fast to changes in write traffic. Also, a single transaction can make record updates across partitions and thus these database systems implement a two-phase commit approach to address this case. But two-phase commit can bog down these systems, especially if it is performed while repartitioning is occurring. Many of the scaling limitations on these database archetypes are a result of the update-in-place approach in which an update to a record at its home involves complex coordination between transactions. Accordingly, these implementations cause cross-transaction coordination that limits scale over and above those limitations intrinsic to RCSI. The present disclosure address, among of things, the technical problem of how to implement a database system that overcomes one or more of the above deficiencies.

In various embodiments described below, a system includes a database, worker nodes, and a transaction coordinator service that comprises coordinator nodes that ensure transactional consistency for database transactions performed by those worker nodes. Uncommitted records, recently committed records, and locks may be stored in partitions that are partitioned by key range (e.g., one of the partitions can store data for the key range "A-C"). A given partition may be managed by a quorum of coordinator nodes, each of which may store a replica of that given partition. In various embodiments, as a worker node executes a database transaction, it interacts with one or more quorums of coordinator nodes to store work and obtain approval to perform actions of that database transaction (e.g., obtain a lock on a key to write a record for that key). If a database transaction involves writing records for key ranges distributed between different partitions, then the worker node may interact with the respective quorums of coordinator nodes that correspond to those different partitions if those partitions are stored by different quorums. The interactions between a worker node and a coordinator node can include requesting a record lock that permits a worker node to write a record for a particular key, requesting permission to commit a transaction, requesting a snapshot time for a transaction, etc.

In various embodiments, a coordinator node processes requests from the worker nodes based on the data stored in its replicas. For example, a worker node may request a record lock for a key from a quorum of coordinator nodes corresponding to the partition that is associated with the key range having that key. Each of the coordinator nodes may check its replica of the relevant partition to determine whether there is any existing record lock that conflicts with the requested record lock and respond to the worker node based on its findings (e.g., granting the lock if there is no conflict). In various embodiments, to obtain a record lock, a snapshot time, and/or commit records, a worker node has to obtain an approval from at least a majority of the coordinator nodes in the quorum (potentially, a majority in multiple quorums in some cases). By requiring a majority consent from a coordinator node quorum, this quorum-based approach ensures that at most one transaction wins. There, however, does not need to be a winner when multiple transactions are competing for the same thing. Consider an example in which there is a quorum with three coordinator nodes and there are two transactions competing to acquire a lock for a certain key. One of those transactions may acquire a lock from one coordinator node, the other transaction may acquire a lock from another coordinator node, and third coordinator node may be unresponsive to the transactions. Since neither transaction acquired the lock from a majority of the three coordinator nodes, in various embodiments, both transactions are rolled back (e.g., to the beginning of a statement) as neither transaction won.

When a worker node seeks to commit a database transaction, in various embodiments, it issues a commit request to the relevant quorums that correspond to the partitions touched by the database transaction. The commit request may specify a future time at which the individual coordinator nodes of the quorums are to process the commit request. When a coordinator node of a given quorum reaches that time (relative to its local clock), it may prepare the uncommitted work for commit and provide a response back to the worker node. As a part of the prepare, the coordinator node may check for conflicts between the database transaction and other database transactions that were committed between the start of that database transaction (which may be defined by a snapshot time) and the processing of the commit request. If a conflict exists, then the coordinator node may deny the request to commit the database transaction. But if there are no conflicts, then the coordinator node may approve the commit. In various embodiments, the worker node waits for at least a majority of the coordinator nodes for each relevant quorum to approve the commit before it commits the transaction in its own worker log and acknowledges the outcome to those coordinator nodes and/ or the client application that triggered the database transaction. But if it does not obtain sufficient approval, then the worker node may roll back at least a portion of the database transaction and potentially try again.

Recently committed work, in various embodiments, is stored in the partitions managed by the transaction coordinator service and at the worker nodes. But over time, that committed work may become stored in an LSM tree of the system, where it is merged down the LSM tree over a period of time. Thus, versions of a record may move through the database system over time. Accordingly, in various embodiments, a record does not have a "home" location (e.g., a page or a B+ tree) where multiple versions of that record are stored. As a result, updates to that record may not involve locking a home location and thus a transaction updating a record can avoid conflicting with a transaction attempting to obtain the latest version of that record committed before its snapshot. Because of this non-update-in-place approach and the characteristic that at most one transaction can win a majority approval from a partition quorum for an action (e.g., obtain a lock for a key), partitions can be repartitioned without stopping transactions.

A partition may have to change due to load traffic and key-range skew. As mentioned, in various embodiments, uncommitted/committed records and record locks are partitioned by key into key-range partitions that are replicated over quorums of coordinator nodes. Over time, some partitions may become too large, e.g., due to a certain key range receiving a large number of writes. To handle load traffic and key-range skew, a coordinator node may implement three different operations with respect to its replicas: split, merge, and relocate.

For the split operation, in various embodiments, the key range of the replica is split into multiple smaller key ranges. Records and/or locks may be copied to a new location on the coordinator node but removed from that the coordinator node. This operation may result in multiple partitions and thus multiple replicas.

For the merge operation, in various embodiments, two or more sub-ranges are merged into a key range. Records and/or locks for those partitions being merged may be stored at a common location on the coordinator node— the multiple partitions may become one partition.

For the relocate operation, in various embodiments, a new replica is created on another coordinator node and the data of the old replica (being relocated) is copied to that new replica. While the data is being copied, the new replica's coordinator node may process new incoming traffic and update the new replica with the results (e.g., the allocation of a new record lock). Once the data has been copied, the old replica may be removed. In some cases, a coordinator node may split a partition into multiple partitions and relocate one or more of those partitions to another coordinator. In this way, a coordinator node can dynamically jettison both storage and traffic.

Repartitioning and quorum are easier when failure conditions may rarely result in competing transactions BOTH losing. It is not necessary to perfectly adjudicate which transaction wins a competition for a lock when failures happen. That dramatically reduces the complexity of the implementation and the robustness of the recovery. It also makes repartitioning easier Relocation may add complexity as worker nodes may have to check multiple locations to find answers, particularly in cases of determining whether another worker node has acquired a lock on a key. Relocation may further consider the quorum architecture in which a given partition resides as replicas on multiple coordinator nodes that collectively act as quorum.

These techniques may be advantageous over prior approaches as these techniques result in a database system that can scale without one or more of the previously-discussed limitations found in database implementations of the discussed archetypes. For example, these techniques provide for a database system that may scale better than a single-writer database as the database system can include multiple worker nodes that can execute updating transactions and thus each of those worker nodes can be a writer. As discussed, a shared-writer database system includes multiple writers, and a record has a home location where multiple versions of that record may be found. Updates to a record involve acquiring exclusive access to the record's home location, which can result in infighting, contention, and coordination between the updating and reading transactions. But a record in the disclosed database system does not have a home location and thus updating and reading transactions do not conflict with each other as updating transactions do not have to lock a location where the current or previous versions of the record exist or vice versa. Previously committed values of the record can be read either from the coordinator (recent) or LSM (older). By avoiding a single home for the record, reading the past is separated from new updates.

In regard to partitioned-writer database systems, these systems also implement updates-in-place (a record has a home location). As a result, moving data from one partition to another is complex and impacts application availability. In particular, a key must be disabled for update in the old partition, the data of that old partition must be moved to the new partition, and then updates to the key-range must be enabled at the new partition. This approach necessitates tight control over the transition. In contrast, because records in the disclosed database system do not have a home location and a quorum majority is used to ensure that at most one transaction wins for any conflict, partitions can be easily moved between different coordinator nodes (and also split and merged) without causing issue as the quorum approach may ensure that a worker node interact with both locations and will observe work that may be in either location. This approach may ensure that at most one transaction wins in a conflict. Accordingly, the disclosed technical solution provides for a database system that does not have one or more of the artificial scaling limitations found in the database implementations of the archetypes. As a result, the disclosed database system may scale to a larger size than the other database implementations while still being performant to meet demands placed on the database system.

Turning now to FIG. 1, a block diagram of a system 100 is shown. System 100 includes a set of components that may be implemented via hardware or a combination of hardware and software routines. In the illustrated embodiment, system 100 includes a database 110, worker nodes 120, and at transaction coordinator service 130. As further shown, database 110 includes a log-structured merge tree (LSM trec) 115, and transaction coordinator service 130 includes transaction coordinator partitions 135A-C. The illustrated embodiment might be implemented differently than shown. For example, system 100 may include a catalog service that maintains metadata (e.g., topology information) usable by worker nodes 120 to access data within system 100.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases, and other entities associated with system 100. In various embodiments, system 100 is implemented using a cloud infrastructure that is provided by a cloud provider. Consequently, database 110, worker nodes 120, and/or transaction coordinator service 130 may utilize the available cloud resources of the cloud infrastructure (e.g., storage resources, network resources, etc.) in order to facilitate their operation. For example, software for implementing a worker node 120 may be stored on a non-transitory computer-readable medium of server-based hardware that is included in a datacenter of the cloud provider and executed in a virtual machine hosted on that server-based hardware. Components 110, 120, and 130 can be implemented without the assistance of a virtual machine or other deployment technologies, such as containerization. In some embodiments, system 100 is implemented utilizing a local or private infrastructure as opposed to a public cloud.

Database 110, in various embodiments, is a collection of information that is organized in a manner that allows for access, storage, and manipulation of that information. Accordingly, database 110 may include supporting software (e.g., storage nodes) that allow for worker nodes 120 to carry out operations (e.g., accessing, storing, etc.) on the information stored at database 110. In various embodiments, database 110 is implemented using a single or multiple storage devices that are connected together on a network (e.g., a storage attached network (SAN)) and configured to redundantly store information in order to prevent data loss. The storage devices may store data persistently and thus database 110 may serve as a persistent storage for system 100. Records that are written to database 110 by a worker node 120 can be accessible to other worker nodes 120. In various embodiments, records may be stored in LSM files as part of LSM tree 115 implemented at database 110.

A record, in various embodiments, is a key-value pair comprising data and a key usable to look up that record. For example, a record may correspond to a row in a database table and specify values for one or more fields of that database table. In various embodiments, records are immutable and thus to update the underlying database construct (e.g., a row in a database table), a new record is written. As a result, a database construct can be associated with multiple records, each of which is a different version of that database construct. Those records can be referred to as "record versions" of the database construct. As an example, a first record (a first record version) may initially be written that stores certain values for a row in a database table and later a second record (a second record version) may be written that updates one or more of the values of the row of the database table. Those two records can be accessible using the same key. The term "record version" is used interchangeably with the term "record" unless indicated otherwise.

LSM tree 115, in various embodiments, is a data structure storing files (having records) in an organized manner that uses a level-based scheme. A level is a storage area in which a set of records are stored. In some embodiments, the levels correspond to different types of storage devices (e.g., solid state drives (SSDs), hard disk drives (HDDs), etc.), where lower levels may correspond to slower devices with higher storage capacity. For example, the top level of LSM trec 115 may be implemented using a random-access memory, the next set of lower levels may be implemented using SSDs, and the remaining lower levels may be implemented using HDDs. In various embodiments, during operation, records are flushed from worker nodes 120 to LSM tree 115, where the records are "merged" down LSM tree 115 over time by being copied from higher levels into lower levels and then removed from those higher levels. Because records are merged down the levels, records in higher levels are newer and thus supersede records in lower levels. For example, two records can be written for the same underlying data construct (e.g., a row in a database table) with one of those records being written later to overwrite one or more values that were included in the other record. Since the former record is written later, it resides in a higher level than the latter record. When performing a single-key search to locate the latest record version for a key, a worker node 120 may traverse the levels of LSM tree 115, starting from the top level until it encounters a record version for that key and then returns that record version as it is the latest record version due to the properties discussed above.

In various embodiments, LSM tree 115 includes older committed work while recently-committed work may be located in transaction coordinator partitions 135 and/or worker nodes 120. Accordingly, when records are committed by a worker node 120, there can be a period of time in which those records are not located in LSM tree 115 as the storage nodes have not yet consumed the worker log 125 of that worker node 120 so that the records can be stored in LSM trec 115. As a record "ages," it may move (e.g., copied to a new location and deleted from an old location) through system 100—e.g., a record may first appear at a worker node 120, then at transaction coordinator partition 135, and finally at LSM tree 115, where it may continue to move by being merged down the levels of LSM tree 115. As such, in various embodiments, a record's location is correlated with time and thus multiple record versions of the same database construct (e.g., a row in a table) may be located throughout system 100 (e.g., the newest version may be in a transaction coordinator partition 135 while another version may be in LSM trec 115). Accordingly, there may not be a home location (e.g., a memory page or a B+ tree) where multiple record versions of the same database construct reside.

Worker nodes 120, in various embodiments, provide various database services, such as data storage, data retrieval, and/or data manipulation. In various embodiments, a worker node 120 is a set of software routines executable on hardware, while in some embodiments, a worker node 120 encompasses both the hardware and the software routines. The database services may be provided to other components in system 100 or to components external to system 100. For example, a database connection (e.g., a Java Database Connectivity (JDBC) connection) might be established between a worker node 120 and an application node (not depicted) to perform a database transaction. The application node may provide various services to users (e.g., a CRM service) and communicate with a worker node 120 to actualize results of interactions with those users (e.g., to update records). Accordingly, the application node may interact with a worker node 120 to perform a database transaction. A database transaction, in various embodiments, is a logical unit of work (e.g., a specified set of database operations/statements) to be performed in relation to a database. For example, processing a database transaction may include executing a SQL SELECT statement to select one or more rows from one or more database tables. The contents of a row may be specified in a record, and thus a worker node 120 may return one or more records that correspond to those one or more rows. In various embodiments, a transaction is executed by a single worker node 120; transactions may not be distributed in which multiple worker nodes 120 participate in the execution of a single transaction.

Performing a database transaction can include a worker node 120 writing one or more records to database 110. Those records may be of two main types: data records and log records. A data record may include data and a key that is usable to look up that data record—e.g., a data record may include the data of a row of a table. A log record may describe one or more database operations (e.g., a record insertion) performed as a result of executing a database transaction. Accordingly, in various embodiments, a worker node 120 writes data records to update values in database objects (e.g., tables) of database 110 and records the changes in log records stored in a worker log 125. The worker node 120 may initially write records (e.g., data records and/or log records) to its local in-memory cache and one or more transaction coordinator partitions. As that cache becomes full or at periodic intervals, the worker node 120 may flush committed records to database 110. As part of flushing records, in various embodiments, the worker node 120 writes them into new files at the top level of LSM tree 115 and, over time, the records of those files are merged down the levels as newer files are written to the top level.

Before committing records and flushing them, in various embodiments, a worker node 120 communicates with transaction coordinator service 130 to ensure that those records do not conflict with record writes performed by other worker nodes 120. As used herein, the phrase "committing a transaction" or "record" is used in accordance with its well-understood meaning and refers to the process of causing changes made during the transaction to be saved and made visible outside of the entity that performs the transaction. When a transaction is committed, its records may be associated with a transaction commit number that is indicative of a time period during the operation of the database. As discussed below, the transaction commit number may be used to determine when those records were written and thus can be used to determine which records were written before or after those records. An example of a worker node 120 interacting with transaction coordinator service 130 to commit records is discussed in greater detail with respect to FIGS. 2A and 2B.

A worker node 120 may further communicate with transaction coordinator service 130 when starting a database transaction to obtain a snapshot time for that database transaction. A worker node 120 may also obtain a snapshot time for a database statement within that database transaction. A snapshot time, in various embodiments, is a value that indicates which records can be read by a worker node 120 for a database transaction or a database statement. In various embodiments, system 100 increments a transaction commit number over time (i.e., as progress is made within the database system), and a snapshot time may correspond to one of the values of the transaction commit number. In some embodiments, a snapshot time is a time value (e.g., a time window covering a millisecond) or a numerical value that is indicative of a time period. Records having a transaction commit number less than (or equal to, in some cases) the snapshot time may be read by a worker node 120. For example, a transaction may be assigned a snapshot time of "445", and thus a worker node 120 may read, for that transaction, records that have a transaction commit number less than or equal to 445. A snapshot time may further be used to ensure that a transaction does not commit a record for a key that conflicts with another record being written or committed for that key after the snapshot time.

In various embodiments, system 100 implements read committed isolation in which a transaction (or, more granularly, a database statement) sees only the records committed before it began and does not see uncommitted data or changes committed during the execution of a concurrent transaction. Each statement of a transaction may acquire a snapshot time to use as it reads, locks, and updates records. As a statement performs updates, system 100 ensures that the keys being written for by the statement have not been written to by other transactions since the statement's snapshot time. In the event that there has been a conflicting update, all changes made by the statement are undone and the statement is rolled back. A new snapshot time may then be acquired that is later than the conflicting update and the work of the statement may be attempted again. For example, suppose that a transaction T2 acquires a snapshot time S2 and attempts to write a record for a key. If another transaction, T1, has committed a record for that key after time S2, then transaction T2 experiences a statement rollback to roll back the relevant statement. After restarting the statement, transaction T2 may acquire a new snapshot time that includes transaction T1's update.

Transaction coordinator service 130, in various embodiments, ensures that the changes made by worker nodes 120 do not break the read committed isolation (discussed above) as they perform database transactions concurrently-transaction coordinator service 130 can facilitate the performance of database transactions and help in ensuring transactional consistency for the database transactions. In various embodiments, transaction coordinator service 130 comprises multiple coordinator nodes that form one or more coordinator quorums/clusters (also referred to as "partition quorums"). A coordinator node may be software that executes on hardware, or it may encompass the hardware and the software. The number of coordinator nodes in a quorum may vary between embodiments—e.g., a quorum may comprise three coordinator nodes, five coordinator nodes, seven coordinator nodes, etc. In various embodiments, coordinator nodes maintain transaction coordinator partitions 135.

A transaction coordinator partition 135, in various embodiments, includes information that may be used to ensure that the concurrent changes made by worker nodes 120 do not break the read committed isolation as they perform database transactions. In various embodiments, a transaction coordinator partition 135 includes information about uncommitted updates (e.g., records of uncommitted transactions), recently committed updates, and record locks granted to transactions. As shown, transaction coordinator partitions 135 can correspond to different key ranges and include the respective above-noted information for their key range. As an example, transaction coordinator partition 135A can be used to store record locks on records whose keys fall in the key range A-C—that is, records whose keys begin with A, B, or C. Partitions 135 may also be partitioned by time in addition to key range. Accordingly, a coordinator node may store multiple partitions 135 for the same key range but each of the partitions 135 pertains to a different time frame (e.g., a different range of transaction commit numbers).

To ensure robustness and empower dynamic relocation to enable scaling of system 100, in various embodiments, multiple instances (depicted in FIG. 1 as replicas 137) of a transaction coordinator partition 135 are maintained. The different replicas 137 of a partition 135 may be stored at different, respective coordinator nodes of transaction coordinator service 130, so that if a coordinator node becomes unresponsive or otherwise unavailable, the information within that transaction coordinator partition 135 may be accessed from another replica 137 on another coordinator node. A coordinator node may also manage replicas 137 from different partitions 135 (e.g., a coordinator node may manage a replica 137 of partition 135A and a replica 137 of partition 135C), and partitions 135 may be distributed across different partition quorums. As discussed in greater detail with respect to FIGS. 4A and 4B, a coordinator node may perform operations to split, merge, and/or relocate partitions 135 based on different circumstances that are experienced by system 100. A coordinator node may perform these operations to handle load traffic and key-range skew and thus the coordinator node may dynamically jettison storage and traffic. By being able to split, merge, and relocate partition replicas, transaction coordinator service 130 may allowed to easily scale as new coordinator nodes may be added to service 130 and provisioned with replicas from already existing coordinator nodes, reducing the workload on those existing coordinator nodes. An example in which a replica is relocated to a different coordinator node is discussed in greater detail with respect to FIG. 5.

While a set of coordinator nodes may be a part of the same quorum or handle respective replicas 137 of the same transaction coordinator partition 135, in various embodiments, those coordinator nodes may not always communicate with each other when performing operations on their respective replicas 137. Accordingly, a coordinator node may process a request based on its own knowledge and perspective independent of the knowledge and perspectives of other coordinator nodes in its quorum. As such, the replicas 137 of a partition 135 may not be exact copies; rather, each replica 137 may represent the knowledge of its corresponding coordinator node that is derived from requests that are observed and processed by the coordinator node. As an example, two coordinator nodes may receive a request from a worker node 120 to obtain a lock on a key. One of the coordinator nodes may successfully process the request and store information about the lock's existence in its replica 137 for a particular partition 135 while the other coordinator node may fail to process the request and thus its replica 137 for that partition 135 does not store information about the lock's existence. Thus, a coordinator node might store an incomplete view of a partition 135.

But, in various embodiments, a worker node 120 has to obtain approval from at least a majority of the coordinator nodes in a partition's quorum before proceeding. (In some cases, a worker node 120 may have to obtain approval from multiple quorums associated with the same partition 135, particularly when a partition is being relocated.) Thus, at least a majority of the coordinator nodes in a partition's quorum will store, in their replica 137, information pertaining to the worker node's request, such as information about a lock that has been allocated. While coordinator nodes may not communicate with each other when processing a request, in various embodiments, coordinator nodes communicate with each other periodically to learn about the information stored in another coordinator node's partition replica 137. For example, if a lock has been granted to a worker node 120 by a majority of a quorum but a particular coordinator node in the quorum is unaware of the lock, it may learn about the lock from other coordinator nodes and thus update it replica 137 to include information about the lock. As another example, if a coordinator node crashes and a new coordinator node is spun, that new coordinator node may communicate with the other coordinator nodes in its quorum to recreate a replica 137 for the particular partition 135.

Throughout the execution of a transaction, in various embodiments, a worker node 120 interacts with coordinator nodes to ensure that its actions do not interfere with actions of other worker nodes 120. When interacting with a group of coordinator nodes, the worker node 120 may send a request (e.g., to obtain a record lock or to commit a transaction) to those coordinator nodes (e.g., some or all of them) and then wait for approval responses from at least a majority of the group of coordinator nodes before proceeding. For example, a worker node 120 seeking to obtain a record lock on a key that falls within the key range D-E may send a request to the group of coordinator nodes that manage the replicas 137 for partition 135B for the record lock. In various embodiments, a coordinator node check for conflicts between requests submitted by the worker node 120 and the information in the relevant replica(s) 137 (e.g., approved locks, committed records, uncommitted records, etc.) managed by the coordinator node. An identified conflict can result in the coordinator node providing a disapproval response back to the worker node 120. In the event that a worker node 120 does not receive a sufficient number of approval responses (e.g., approval responses from a majority of the relevant group of coordinator nodes), the worker node 120 may proceed down a different path (e.g., rollback a statement and retry). An example in which multiple worker nodes 120 attempt to obtain a lock for the same key for their respective transactions is discussed in more detail with respect to FIG. 3. In the example, neither worker node 120 is able to obtain majority approval and thus neither transactions wins the lock, which may result in both transactions being partially rolled back or aborted.

Turning now to FIG. 2A, a block diagram of an example in which a request is processed at a particular time by coordinator nodes of partitions 135. During the execution of a database transaction, a worker node 120 may send a request to certain coordinator nodes of transaction coordinator service 130 to approve a set of requested actions (e.g., to obtain approval to commit the database transaction, to obtain a snapshot time, to obtain a lock on a primary key, etc.). In the illustrated embodiment, worker node 120 issues requests to coordinator nodes (not shown) of partitions 135A-C to approve, e.g., the commitment of a database transaction that involved each partition 135 in its execution. Worker node 120 proposes a commit time of "T-09". In various embodiments, the proposed time (at which a coordinator node may process the request) is selected by worker node 120 based on its knowledge of the local times that are identified by local clocks of the coordinator nodes.

A local clock, in various embodiments, identifies the local time that is observed by a node (e.g., a worker node 120 or a coordinator node). In various embodiments, the local clock of a node may indicate a transaction commit number or another numerical value indicative of a state of the database system—that is, the time value may not be the actual time (e.g., 7 pm), but rather a logical construct that can be used to represent or identify forward progress in the database system. In various embodiments, nodes performs certain database operations based on the time of their local clock. As an example, coordinator nodes may process requests from worker nodes 120 at certain times—i.e., when their local clocks reach those times, which may be times requested by those worker nodes. Worker nodes 120 and coordinator nodes, in various embodiments, each have their own opinion of the current time within system 100 that is based on their local clock. The local clocks of worker nodes 120 and/or coordinator nodes, however, can become out of sync with each other over time. Accordingly, a worker node 120 may select a time further in the future than the local times of a majority of the coordinator nodes for each partition 135 involved in the request.

When a coordinator node reaches the proposed time of "T-09" in FIG. 2A, in various embodiments, the coordinator node determines whether the requested actions conflict with any information in the relevant replica 137 up until that proposed time. For example, a coordinator node having a replica 137 for transaction coordinator partition 135A might determine whether the database transaction executing at worker node 120 has produced a record that conflicts with a record that was approved for commit at a time occurring between the transaction's snapshot time (or a statement's snapshot time) and the proposed commit time. If there will be a conflict, then a coordinator node denies the request, which may cause worker node 120 to rollback a portion or all of the database transaction if it does not receive majority approval from a quorum of a partition 135 (e.g., from a quorum of coordinator nodes having replicas 137 of partition 135A). But if there is no conflict from the coordinator node's perspective, then it approves the request and may update its replica 137 to reflect the approval. In response to majority approval from each partition 135, worker node 120 may then proceed to commit the transaction within its worker log 125.

Figure 2B:
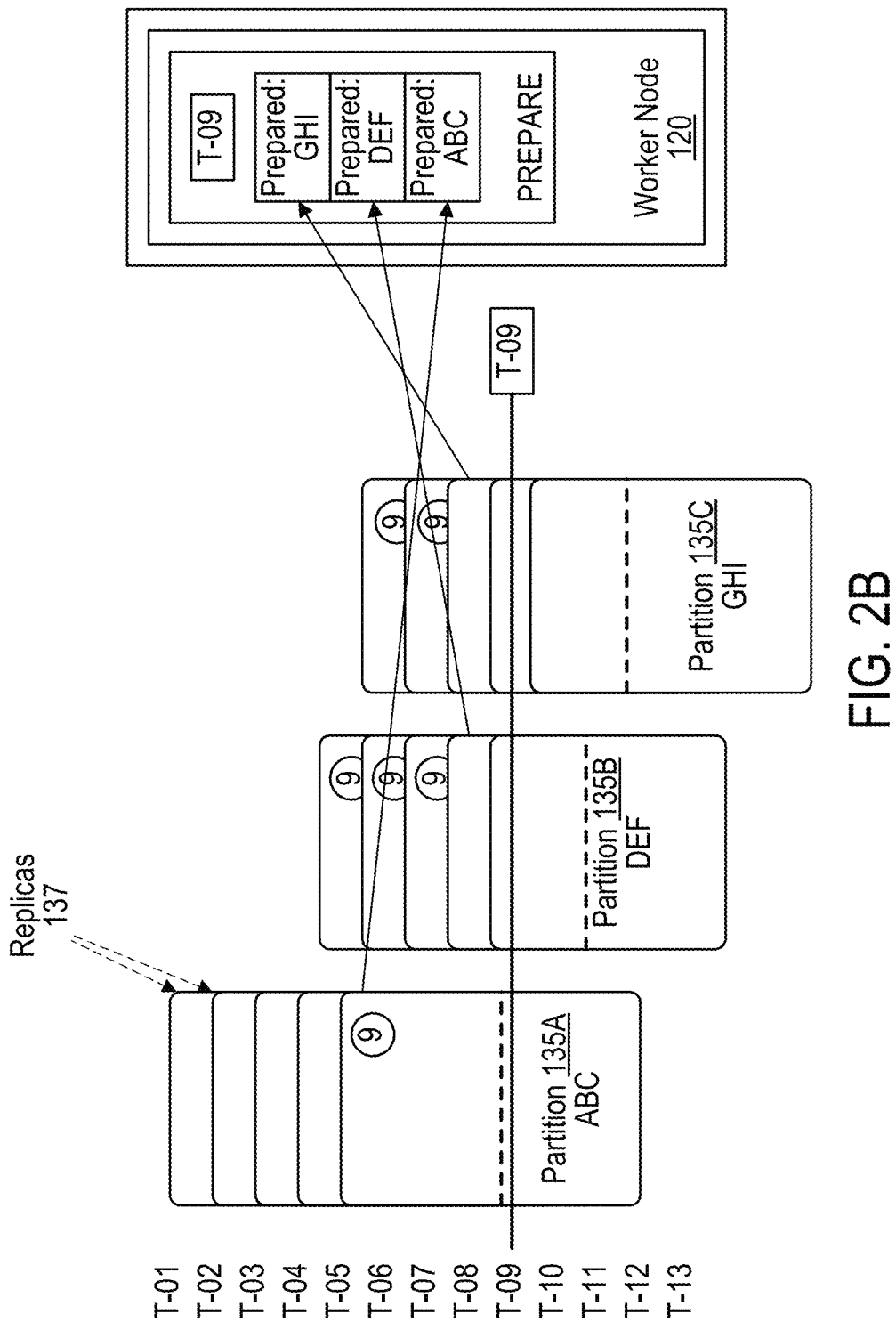

Turning now to FIG. 2B, a block diagram of an example in which a request is processed at a particular time. As shown, partitions 135A-C each include a set of replicas 137 that process a request from a worker node 120 at a time "T-09." In some cases, a given replica 137 may be further in time than T-09 and thus worker node 120 may not receive an approval response from that replica's coordinator node. In some cases, a coordinator node may significantly slow down such that it does not reach T-09 in a timely manner. In some cases, a replica 137 may have an incomplete view and return a response that is not reflective of the actual state of the majority of the database system. In all those cases, in various embodiments, worker node 120 proceeds with an action in response to receiving approval from at least a majority of replicas 137 of each partition 135 that is involved in the request. For example, worker node 120 may request a lock of a key that falls within the key range of partition 135A and thus worker node 120 may proceed with the lock if it receives approval responses from a majority of the coordinator nodes of the replicas 137 of partition 135A.

Figure 3:
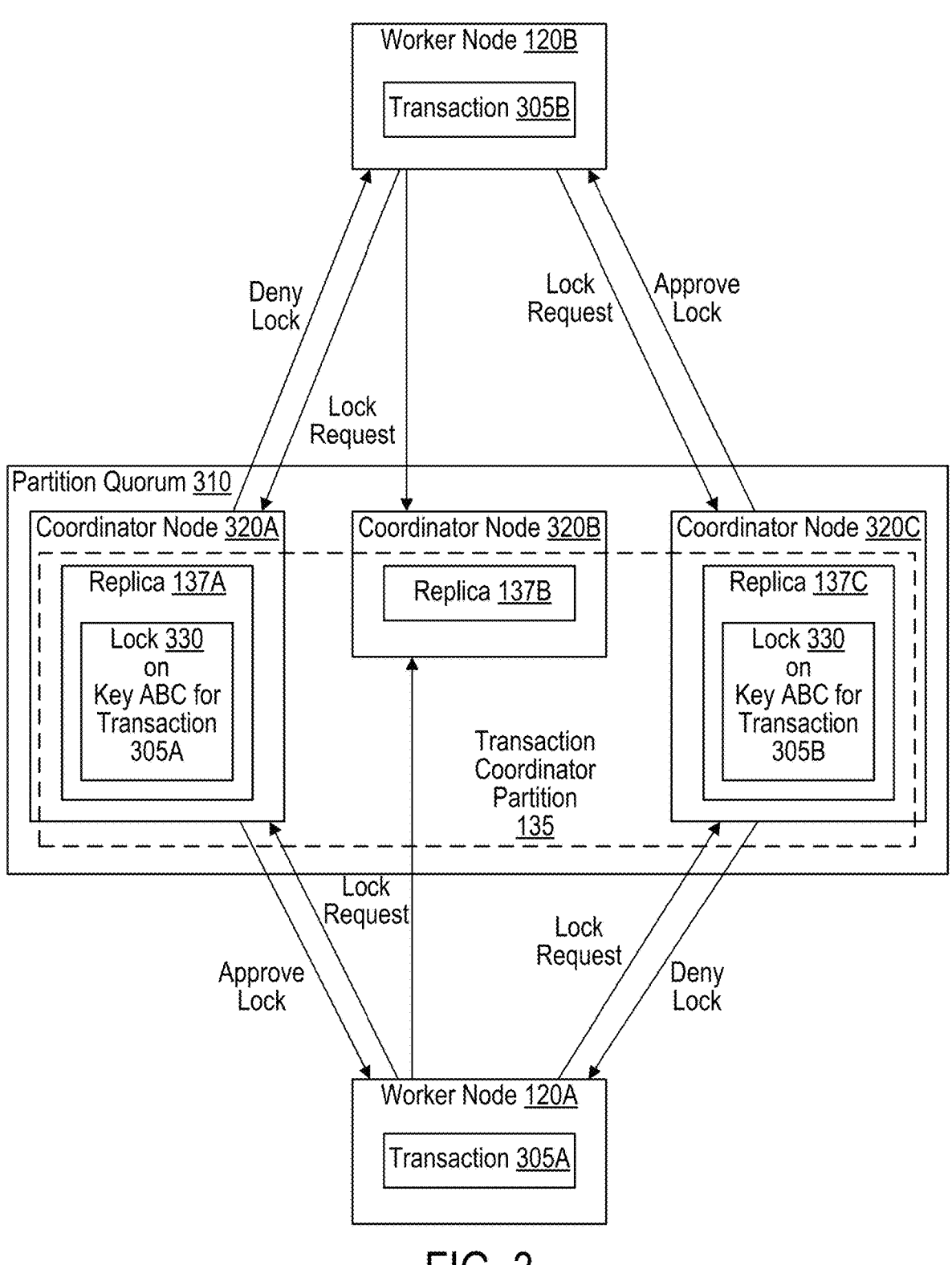
FIG. 3 is a block diagram illustrating an example in which multiple transactions attempt to acquire a lock but neither transaction wins the conflict, according to some embodiments.

Turning now to FIG. 3, a block diagram of an example in which multiple transactions attempt to acquire a lock is shown. In the illustrated embodiment, there are worker nodes 120A and 120B and a partition quorum 310 that includes coordinator nodes 320A-C. Also as shown, coordinator nodes 320A-C include replicas 137A-C, respectively, of a partition 135 and worker nodes 120A and 120B execute transactions 305A and 305B. The illustrated embodiment may be implemented differently than shown. For example, there may be multiple partition quorums 310 for the same partition 135 and therefore worker nodes 120A and 120B may interact with multiple partition quorums 310 to acquire a lock on a key to write a record for a transaction.

Partition quorum 310, in various embodiments, is a group of multiple coordinator nodes 320 that each store a replica 137 for a particular partition 135. When performing an action that affects that partition 135 (e.g., acquiring a lock on a key in order to write a record for that key), in various embodiments, a worker node 120 has to obtain a majority approval from coordinator nodes 320 in that partition's quorum(s) 310. As shown, worker nodes 120A and 120B execute transactions 305A and 305B. For the following discussion, it is assumed for this example that both transactions 305 seek to write a record for the same key that falls within the key range of the illustrated partition 135. In order to write a record for that key, worker nodes 120A and 120B have to acquire a lock 330 on that key for their transaction 305. In various embodiments, worker nodes 120A and 120B have to obtain a majority approval from partition quorum 310 to acquire that lock 330.

A lock 330, in various embodiments, is a construct used to protect a database resource (e.g., a database object) from being manipulated by another entity other than the holder of that lock 330. A lock 330 may take the form of a record that is stored in a partition 135. In various embodiments, a lock 330 is acquired on a particular database resource (e.g., a key, a table, an index, etc.) and has a lock mode (e.g., is access shared). Locks 330 may be acquired on a per-statement basis (e.g., for each database statement) and on a per-transaction basis. In various embodiments, exclusive locks 330 are granted to at most one transaction at a time on a database object (e.g., a key). In particular, exclusive locks 330 may be acquired on a record's key if no other transaction acquired the lock 330 first. In various embodiments, lock conflicts cause a statement level rollback and advance the statement snapshot time. By acquiring an exclusive lock 330 on the key, the transaction ensures that it has precedence over competing transactions and will likely commit its changes. In various cases, a transaction makes incremental progress acquiring locks 330 within statements and across statements. Similar to records, in various embodiments, locks 330 are partitioned by key-range, although a lock 330 may not be acquired on a key range in some embodiments.

As shown, worker nodes 120A and 120B issues requests for a lock 330 to coordinator nodes 320A-C. Coordinator nodes 320A-C may process the requests based on the information stored in their respective replicas 137. In the illustrated embodiment, coordinator node 320A processes worker node 120A's request for the lock 330 before worker node 120B's request for the lock 330. Coordinator node 320A does not detect a conflict (i.e., no other conflicting lock 330) and thus returns an approval response to worker node 120A. Coordinator node 320A may record the approval of the lock 330 to worker node 120A in its replica 137A. When processing worker node 120B's request, coordinator node 320A detects a conflict because it allocated that lock 330 to worker node 120A and thus returns a denial response to worker node 120B. In the illustrated embodiment, coordinator node 320C processes worker node 120B's request for the lock 330 before worker node 120A's request for the lock 330. Coordinator node 320C does not detect a conflict and thus returns an approval response to worker node 120B. Coordinator node 320C may record the approval of the lock 330 to worker node 120B in its replica 137C. When processing worker node 120A's request, coordinator node 320C detects a conflict and thus returns a denial response to worker node 120A.

In the illustrated embodiment, coordinator node 320B does not respond to either worker node 120A or 120B. Coordinator node 320B may not respond for any of various reasons, such as coordinator node 320B crashing. Since neither worker node 120A nor 120B has obtained a majority approval (i.e., they each need to two approvals but have only one), neither obtains the lock 330 and thus there is no winning transaction in the example. After a period of time, worker nodes 120A and 120B may roll back a portion of their transaction 305 and then attempt again to acquire the lock 330. Worker nodes 120A and 120B may inform coordinator nodes 320A and 320B, respectively, that they did not obtain the lock 330 so that coordinator nodes 320A and 320B can update the information in their respective replica 137. If coordinator node 320B was responsive and processed worker node 120A's request first (for example) and issued an approval response to worker node 120A, then worker node 120A acquires the lock 330 since it has obtained majority approval. Accordingly, there can be a most one winning transaction 305 (e.g., for a lock 330, for a commit, etc.) since there can be no winning transactions 305 or one winning transaction 305.

Figures 4A, 4B:
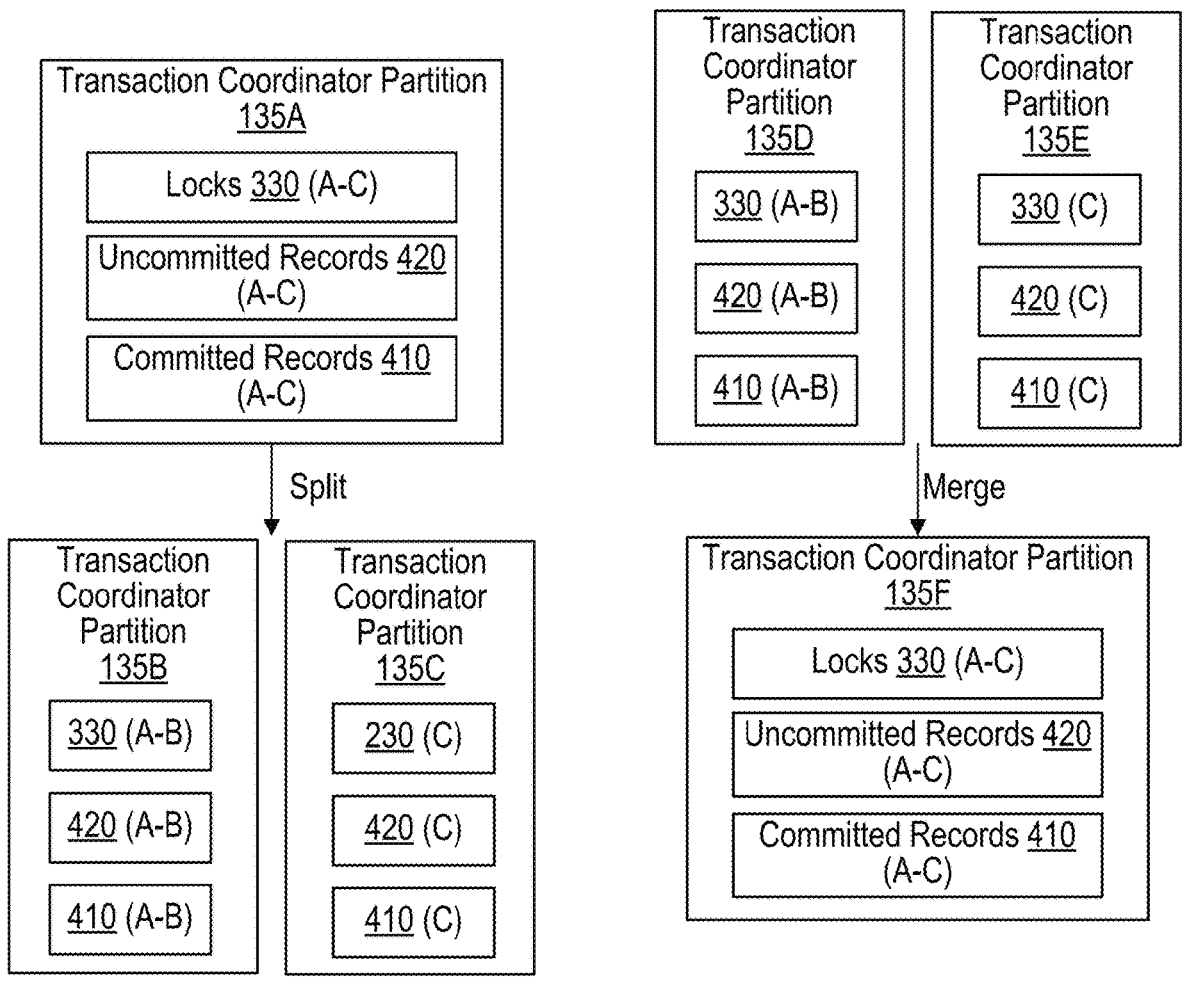
FIG. 4A-B are block diagrams illustrating example elements of partition operations that can be performed by a coordinator node, according to some embodiments.

Turning now to FIG. 4A, a block diagram of an example split operation and an example merge performed on a set of transaction coordinator partitions 135 is shown. In the illustrated embodiment, before the split operation is performed, transaction coordinator partition 135A logically groups, into a single key range A-C, committed records 410, uncommitted records 420 and locks 330. But after the split operation, committed records 410, uncommitted records 420 and locks 330 are split into two keys ranges: the key range A-B and the key range C. In some embodiments, the split operation can result in multiple transaction coordinator partitions 135 and/or more than two key ranges. Further, in some embodiments, committed records 410, uncommitted records 420 and locks 330 may be a part of their own partitions 135 or their own replicas 137 for a partition 135.

As mentioned, in various embodiments, transaction coordinator partition 135 includes information that may be used to ensure that concurrent changes made by worker nodes 120 do not break the read committed isolation. Committed records 410, in various embodiments, are records that have been recently committed by a worker node 120 but may not have been pushed yet to database 110 (e.g., written to the top level of LSM tree 115). In particular, after a worker node 120 commits a database transaction in its worker log 125, it may then notify the relevant coordinator nodes that the transaction has committed. The transactional updates are then visible at the coordinator nodes to any reads later than a transaction's snapshot time. As such, a worker node 120 may access committed records 410 from coordinator nodes instead of LSM tree 115, especially in cases in which those records are not stored in LSM tree 115.

Uncommitted records 420, in various embodiments, are records that have not yet been committed by respective worker nodes 120. Knowledge about uncommitted records 420 may be used by a given coordinator node to ensure the conflicting records are not committed. For example, a transaction T1 may commit a record (which is listed in committed records 410) that is not visible to a transaction T2 whose snapshot time is before the commitment of that record. Transaction T2 may write a record for the same database key and request permission to commit that record. The given coordinator node may observe that the commitment of the former record was committed after T2's snapshot time and conflicts with the latter record. Accordingly, that coordinator node may deny the request to permit the commitment of transaction T2. In various embodiments, uncommitted records 420 become committed records 410 (within partition 135) in response to a worker node 120 committing the transaction that produced those uncommitted records 420— that is, the coordinator nodes managing the replicas 137 of the relevant partition 135 convert uncommitted updates to record-versions as transactions are committed.

In some cases, large amounts of read traffic can align to a narrow key range of data and as a result, it may be desirable to dynamically split the replicas 137 of a transaction coordinator partition 135 and/or make new replicas 137. Consequently, a coordinator node may perform a split operation on its replica 137 for the relevant transaction coordinator partition 135. In some embodiments, splitting a replica 137 involves logically dividing the data within the replica 137 without moving the data from the coordinator node. Splitting the replica 137 may generate two or more replicas 137 that may be stored on the same coordinator node or different coordinator nodes. Splitting a replica 137 may be a local operation performed at each coordinator node. In some cases, the splitting of the replicas 137 of a transaction coordinator partition 135 happens at least partially in parallel. But in other cases, a coordinator node may decide to split its replica 137 and subsequently inform the coordinator nodes having the other replicas 137 to split their replicas 137.

As shown in FIG. 4A, the split operation results in the data of partition 135A being split into two partitions 135B and 135C and thus the coordinator node may store two replicas 137, one for each partition. Since the replicas 173 of partitions 135B and 135C are stored separately but on the same coordinator node after the split operation in various embodiments, traffic that is directed to one partition 135B may not conflict or otherwise compete with traffic directed to the other partition 135C. Furthermore, after the split operation, the coordinator node may then relocate one or more of the resulting replicas 137 to another coordinator node, allowing for the former coordinator node to reclaim storage and reduce its traffic load.

Since the split operation can result in multiple partitions 135, in various embodiments, the coordinator node informs the other coordinator nodes associated with the original partition (i.e., partition 135A in the illustrated embodiment) about the splitting so that they can split that original partition 135 into the multiple partitions 135 in order to ensure consistency among the quorum—that is, they can split their replica 137 of the original partition 135 into replicas 137 corresponding to the multiple partitions 135. In some cases, while the other coordinator nodes may eventually arrive at the same split, the other coordinator nodes may split their replica 137 of the original partition 135 differently. Over time, the coordinator nodes may split and merge replicas 137 of partitions 135 until the coordinator nodes arrive at the same resulting number of partitions 135 from the original partition 135.

In various embodiments, merge operations can also be performed by coordinator nodes to combine replicas 137. When two adjacent key ranges have a respective replica 137 located on the same coordinator node, their key ranges may be merged into a larger key range, which can result in a new replica 137 that includes the data of the replicas 137 that are combined. As shown in FIG. 4A, partitions 135D and 135E are combined into a partition 135F. Accordingly, a coordinator node may originally include two replicas 137 (one for partition 135D and 135E) and merge them into one replica 137 corresponding to partition 135. In various cases, merging multiples replicas 137 involves logically combining the data within the replicas 137 without moving the data on the coordinator node. Further, a merge may be at first local to a particular coordinator node and knowledge of this merge may "lazily" propagate through system 100, as discussed above with respect to the split operation.

Turning now to FIG. 4B, a block diagram of an example relocate operation performed for a replica 137 is shown. In the illustrated embodiment, there are two coordinator node 320A-B that are part of transaction coordinator service 130. Also as shown, coordinator node 320A includes a replica 137A of a transaction coordinator partition 135, and coordinator node 320B includes a replica 137B that is derived from replica 137A as part of the relocate operation. The illustrated embodiment may be implemented differently than shown. For example, the relocate operation may result in multiple new replicas 137.

As discussed, each partition 135 can comprise multiple replicas 137 that can be updated and read by coordinator nodes 320. To cope with evolving system load, a replica 137 may need to be relocated from one coordinator node 320 to another coordinator node 320 without causing interruptions to ongoing transactions and their snapshot reads, locks, updates, and subsequent transaction commitment. In various embodiments, relocating involves generating a new replica 137 and loading it with pre-existing state (e.g., locks 330, uncommitted records 420, etc.) from one or more of the other replicas 137 that form the transaction coordinator partition 135. While the new replica 137 is being loaded with state, its coordinator node 320 may process ongoing traffic (e.g., lock requests, commit requests, etc.) from worker nodes 120 and insert the results (e.g., new locks 330) in the new replica 137. Consequently, the new replica 137 may be loaded with pre-existing state and new state from new incoming traffic.

Also as discussed, in various embodiments, a worker node 120 waits for approval from at least a majority of the coordinator nodes 320 of a transaction coordinator partition 135 before proceeding with a database transaction—this ensures that the results (e.g., a new lock 330) of the processing of the worker node's request is persisted in a majority of the replicas 137 of the transaction coordinator partition 135. But the addition of the new replica 137 may temporarily change how many approval responses for which the worker node 120 waits before proceeding. Consider an example in which there are seven replicas 137 and thus the worker node 120 waits for approvals from four of those replicas (that is, from their coordinator nodes 320). With the addition of a new replica 137, the worker node 120 then waits for approvals from five out of the eight replicas 137. After loading the new replica 137 with state from an old replica 137, in various embodiments, the old replica 137 is retired. The retirement of the old replica 137 may change the quorum rules (e.g., obtaining approvals from a majority) as the number of replicas 137 for the particular transaction coordinator partition 135 decreases. As discussed in greater detail with respect to FIG. 5, in some embodiments, the relocate operation temporarily results in multiple quorums of coordinator nodes 320 for a partition 135.

As part of the relocating process, each committed record 410 and uncommitted record 420 may be copied from one or more old replicas 137 to the new replica 137. Reading as—of a snapshot time may require only reading enough replicas 137 of a partition 135 (e.g., a majority) to ensure that all committed updates are located and combined by a worker node 120. Likewise, locks 330 may be copied from an old replica 137 to the new replica 137. Database transactions, in various embodiments, are correct as long as exclusive locks (and updates) are granted to at-most-one database transaction at a point in time. A worker node 120 may obtain a lock 330 if it receives approval from a majority of the replicas 137 (of the key being locked). The copying of the locks 330 from an old replica 137 to a new replica 137 and the temporary increase in the number of replicas 137 in a transaction coordinator partition 135 does not cause any exclusive lock 330 to be granted to more than one database transaction. In some cases, a transaction may lose permission to lock a key if the old replica 137 does not have a record of the lock 330 and the addition of the new replica 137 causes the transaction to lose its majority.

Accordingly, replicas 137 of transaction coordinator partitions 135 may autonomously split, merged, and relocated as needed to cope with scaling pressure. Further, new coordinator nodes 320 may be added as well to cope with the pressure.

Figure 5:
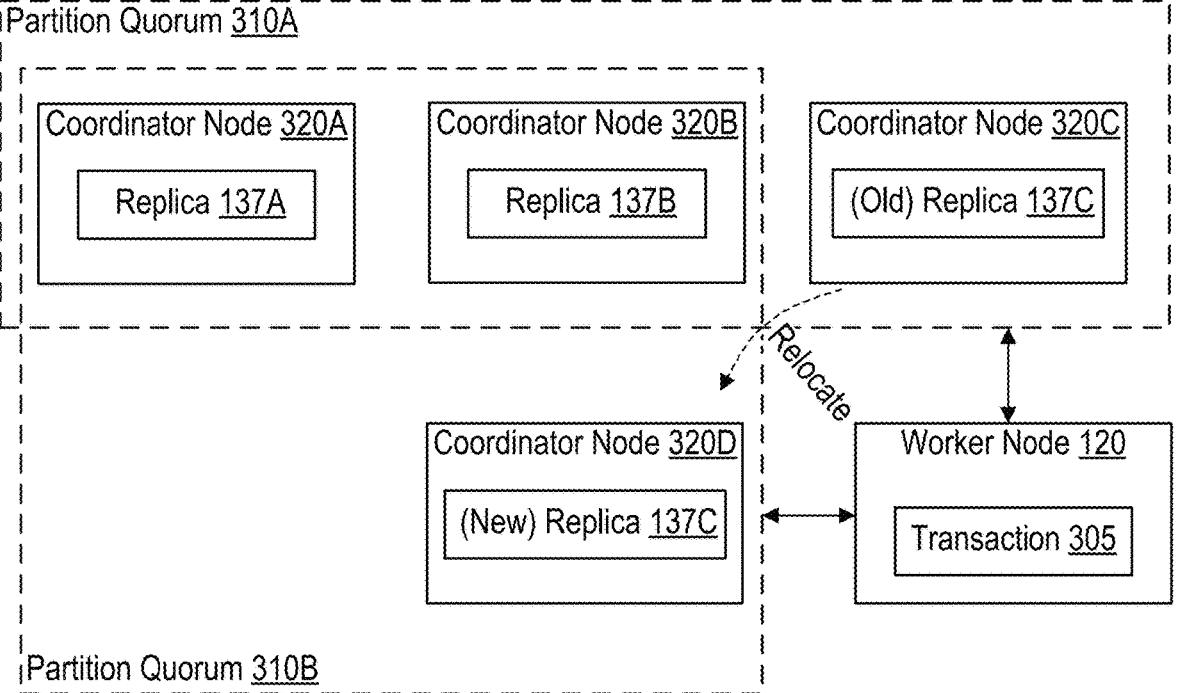
FIG. 5 is a block diagram illustrating an example in which a worker node interacts with multiple partition quorums during a relocation of a replica of a partition, according to some embodiments.

Turning now to FIG. 5, a block diagram of an example in which a worker node interacts with multiple partition quorums during a relocation of a partition is shown. In the illustrated embodiment, there is a worker node 120 and partition quorums 310A and 310B. Also as shown, partition quorum 310A includes three coordinator nodes 320A-C, and partition quorum 310B includes three coordinator nodes 320A, 320B, and 320D. The illustrated embodiment may be implemented differently than shown. As an example, partition quorums 310A and 310B may include more than three coordinator nodes 320.

As discussed, a coordinator node 320 may relocate a replica 137 to another coordinator node 320. In various embodiments, the relocate operation can result in multiple quorums 310 while the content of that replica 137 is being copied to the target coordinator node 320. In the illustrated embodiment, coordinator node 320 relocates replica 137C to coordinator node 320D and while the replica 137C is being relocated, there are two partition quorums 310 for the same transaction coordinator partition 135. In various embodiments, to obtain a lock 330 and/or to perform another action (e.g., commit a transaction), worker node 120 has to obtain a majority approval from at least one of the partition quorums 310 that are associated with the transaction coordinator partition 135 affected by the action.

Accordingly, in the illustrated embodiment, when seeking to obtain a lock 330 on a key for a transaction (for example), worker node 120 sends requests to partition quorums 310A and 310B—i.e., coordinator nodes 320A-D may each receive a request from worker node 120. The coordinator nodes 320 in quorums 310A and 310B may each check their respective replica 137 for any conflicts associated with worker node 120 obtaining the lock 330 and provide either an approval response or a denial response (or no response in some cases) to worker node 120. In various embodiments, upon receiving approval responses from a majority of the coordinator nodes 320 in at least one of the quorums 310, worker node 120 obtains the lock 330 and then continues executing its transaction 305. But in some embodiments, worker node 120 has to obtain approval responses from a majority of the coordinator nodes 320 in all quorums 310 associated with the relevant partition(s) 135. For example, worker node 120 may have to obtain approval responses from a majority of coordinator nodes 320A-C of quorum 310A and also approval responses from a majority of coordinator nodes 320A, 320B, and 320D of quorum 310B. If worker node 120 does not obtain majority approval from the relevant quorums 310, in various embodiments, it may roll back at least a portion of the transaction and then try again.

By interacting with both quorums 310A and 310B, potential conflicts associated with worker node 120's request can be observed since locks 330 and committed records 310 cannot exist without majority approval from at least one of the quorums 310, in various embodiments. Accordingly, coping the data of a replica 137 to another coordinator node 320 does not result in missed conflicts occurring between transactions as worker node 120 checks with both the old location of that replica 137 and the new location of that replica 137—that is, worker node 120 may check with both the old quorum 310 and the new quorum 310 to cope with relocation of locks 330 and/or updates. After a replica 137 has been relocated to the new quorum 310, in various embodiments, the old quorum 310 ceases to exist. For example, partition quorum 310A may cease to exist after replica 137C has been copied to coordinator node 320D. Furthermore, space may be reclaimed in the old replica 137 (e.g., the locks 330 and updates in replica 137C at coordinator node 320C may be deleted to reclaim space at coordinator node 320C).

Turning now to FIG. 6, a flow diagram of a method 600 is shown. Method 600 is one embodiment of a method that is performed by coordinator nodes (e.g., coordinator nodes 320) to ensure transactional consistency for transactions performed by worker nodes (e.g., worker nodes 120). Method 600 may be performed by executing a set of program instructions stored on a non-transitory computer-readable medium. Method 600 may include more or fewer steps than shown. For example, method 600 may include a step in which a coordinator node merges multiple replicas into a single replica.

Method 600 begins in step 610 with multiple coordinator nodes of a database system (e.g., system 100) storing replicas (e.g., replicas 137) of a particular one of a plurality of partitions (e.g., partitions 135) partitioned by key range. In various embodiments, a given one of the replicas includes information about granted locks (e.g., locks 330) and records (e.g., committed records 410 and uncommitted records 420) that are produced by a set of a plurality of worker nodes operable to perform database transactions. The multiple coordinator nodes may be operable to ensure transactional consistency for database transactions. In step 620, the multiple coordinator nodes receive, from multiple worker nodes, requests to grant a lock for a key to permit a worker node to write a record for the key as part of executing a database transaction. In step 630, a given one of the multiple coordinator nodes sends an approval response for the lock to at most one of the multiple worker nodes. In various embodiments, a single one of the multiple worker nodes acquires the lock in response to receiving approval responses from a majority of the multiple coordinator nodes. In various embodiments, none of the multiple worker nodes acquire the lock in response to none of the multiple worker nodes receiving approval responses from a majority of the multiple coordinator nodes.

A first coordinator node of the multiple coordinator nodes may determine to relocate, to a second coordinator node of the database system, at least a portion of the first coordinator node's replica of the particular partition. Accordingly the first coordinator node may copy the at least a portion of the first coordinator node's replica to the second coordinator node. A given one of the plurality of worker nodes may be operable to, during the coping, issue requests to both the first and second coordinator nodes for permission to perform a specified action associated with the particular partition. The multiple coordinator nodes form a first quorum for the particular partition (e.g., partition quorum 310A) and the second coordinator node and the multiple coordinator nodes without the first coordinator node form a second quorum for the particular partition (e.g., partition quorum 310B). In various embodiments, to perform the specified action, the given worker node has to acquire approval responses from a majority of coordinator nodes in at least one of the first and second quorums. The given worker node may be operable to issues requests to the second coordinator node for locks and to store new uncommitted work for the particular partition in response to the first coordinator node determining to relocate at least a portion of the first coordinator node's replica.

A first coordinator node of the multiple coordinator nodes may determine, based on a set of characteristics (e.g., the size) of the first coordinator node's replica of the particular partition, to locally split the first coordinator node's replica of the particular partition into a plurality of replicas corresponding to a plurality of subpartitions representing a splitting of the particular partition. In response to the determining, the first coordinator node splits the first coordinator node's replica of the particular partition into the plurality of replicas. The first coordinator node may inform one or more of remaining ones of the multiple coordinator nodes about the splitting to cause the one or more coordinator nodes to split their replicas of the particular partition. The plurality of replicas at the first coordinator node may include fewer replicas than a number of replicas into which a second coordinator node of the multiple coordinator nodes has split the second coordinator node's replica of the particular partition.

A first coordinator node of the multiple coordinator nodes may determine, based on a set of characteristics of the first coordinator node's replica of the particular partition, to locally merge two or more replicas into a single replica corresponding to a single partition representing a merging of two or more partitions. In response to the determining, the first coordinator node may merge the two or more replicas (whose key ranges may be adjacent) into the single replica. After the merging of the two or more replicas into the single replica, the first coordinator node may split the single replica into a different number of replicas than a number of replicas of the two or more replicas.

A first coordinator node of the multiple coordinator nodes may remove committed records from its replica of the particular partition based on committed records associated with the replica being persisted in a persistent store (e.g., database 110). The first coordinator node may receive a different replica from a different coordinator node of the database system. While information of the different replica is being received, the first coordinator node may process requests from ones of the plurality of worker nodes. Processing at least one of the requests may include storing a lock in the different replica that is granted in association with the at least one request.

Exemplary Computer System

Figure 7:
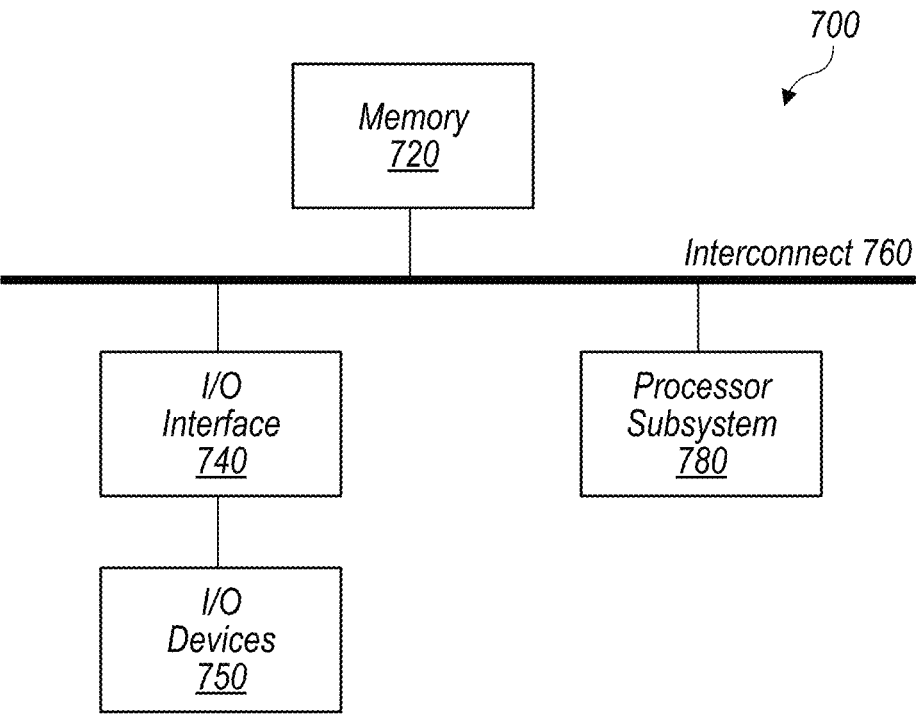
FIG. 7 is a block diagram illustrating elements of a computer system for implementing various systems described in the present disclosure, according to some embodiments.

Turning now to FIG. 7, a block diagram of an exemplary computer system 700, which may implement system 100, a database 110, a worker node 120, transaction coordinator service 130, and/or a coordinator node 230, is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement a worker node 120 and/or a coordinator node 230 may be included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims.

Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112 (f) during prosecution of a United States patent application based on this disclosure, it will recite claim elements using the "means for" [performing a function] construct.

What is claimed is:

1. A method, comprising:
   storing, by a plurality of coordinator nodes of a database system, a respective replica of a data partition, wherein the respective replica includes information about locks granted to ones of a plurality of worker nodes that perform database transactions;

determining, by a first coordinator node of the plurality of coordinator nodes, to relocate at least a portion of the respective replica to a second coordinator node;

copying, by the first coordinator node, the portion of the respective replica to the second coordinator node;

during the copying, receiving, by the plurality of coordinator nodes and the second coordinator node, requests from multiple worker nodes to grant a lock for a key that permits a worker node to write a record for the key as part of executing a database transaction;

determining, by multiple of the plurality of coordinator nodes and the second coordinator node independently, whether to grant the lock based on whether the lock conflicts with granted locks stored in their respective replica; and sending, by a given coordinator node that determines to grant the lock, an approval response for the lock to at most one of the multiple worker nodes, wherein a single one of the multiple worker nodes acquires the lock in response to receiving approval responses from a majority of a quorum having ones of the plurality of coordinator nodes and the second coordinator node.

2. The method of claim 1, wherein the plurality of coordinator nodes form a first quorum for the data partition, and the second coordinator node and the plurality of coordinator nodes without the first coordinator node form a second quorum for the data partition, wherein, to acquire the lock, the single worker node has to acquire approval responses from a majority of coordinator nodes in at least one of the first and second quorums.

3. The method of claim 1, wherein a given one of the plurality of worker nodes is operable to issue requests to the second coordinator node for locks and to store new uncommitted work for the data partition in response to the first coordinator node determining to relocate the at least a portion of the first coordinator node's respective replica.

4. The method of claim 1, further comprising:
   determining, by the first coordinator node based on a set of characteristics of the first coordinator node's respective replica, to locally split the first coordinator node's respective replica into a plurality of replicas corresponding to a plurality of subpartitions representing a splitting of the data partition; and
   splitting, by the first coordinator node, the first coordinator node's respective replica into the plurality of replicas.

5. The method of claim 4, further comprises:
   informing, by the first coordinator node, one or more of remaining ones of the plurality of coordinator nodes about the splitting to cause the one or more coordinator nodes to split their respective replica of the data partition.

6. The method of claim 4, wherein the plurality of replicas include fewer replicas than a number of replicas into which a third coordinator node of the plurality of coordinator nodes has split the third coordinator node's respective replica of the data partition.

7. The method of claim 1, further comprising:
   determining, by the first coordinator node based on a set of characteristics of the first coordinator node's respective replica, to locally merge the first coordinator node's respective replica with a replica of an adjacent data partition into a single replica corresponding to a single data partition representing a merging of the data partition and the adjacent data partition; and merging, by the first coordinator node, the first coordinator node's respective replica with the replica of the adjacent data partition into the single replica.

8. The method of claim 7, further comprising:

after the merging, the first coordinator node splitting the single data partition into a different number of data partitions than two data partitions.

9. The method of claim 7, wherein key ranges of the first coordinator node's respective replica and the replica of the adjacent data partition are adjacent.

10. A non-transitory computer-readable medium having program instructions stored thereon that are capable of causing a computer system to implement a first coordinator node that performs operations comprising:

storing a replica of a data partition, wherein the replica includes information about locks granted to ones of a plurality of worker nodes that perform database transactions for a database system, and wherein the first coordinator node is one of a plurality of coordinator nodes that is operable to ensure transactional consistency for database transactions;

determining to relocate at least a portion of the replica to a second coordinator node;

copying the portion of the replica to the second coordinator node;

during the copying, receiving, from multiple worker nodes of the plurality of worker nodes, requests to grant a lock for a key that permits a worker node to write a record for the key as part of executing a database transaction, wherein the multiple worker nodes are operable to send requests to the second coordinator node to grant the lock; and sending an approval response for the lock to at most one of the multiple worker nodes, wherein a single one of the multiple worker nodes acquires the lock in response to receiving approval responses from a majority of a quorum having ones of the plurality of coordinator nodes and the second coordinator node.

11. The non-transitory computer-readable medium of claim 10, wherein the operations further comprise:

performing a split operation on the replica to logically split the replica into two or more replicas corresponding to two or more subpartitions that represent a splitting of the data partition; and performing a merge operation on the replica to logically merge the replica and another replica into a single replica corresponding to a single partition representing a merging of two partitions, wherein the split and merge operations are performed independent of other ones of the plurality of coordinator nodes.

12. The non-transitory computer-readable medium of claim 10, wherein the operations further comprise:

removing committed records from the replica based on committed records associated with the replica being persisted in a persistent store.

13. The non-transitory computer-readable medium of claim 10, wherein the operations further comprise:

receiving a different replica from a different coordinator node of the database system; and while information of the different replica is being received, process requests from ones of the plurality of worker nodes, wherein processing at least one of the requests includes storing a lock in the different replica that is granted in association with the at least one request.

14. A system, comprising:

at least one processor; and memory having program instructions stored thereon that are executable by the at least one processor to cause the system to implement a first coordinator node that performs operations comprising:

storing a replica of a data partition, wherein the replica includes information about locks granted to ones a plurality of worker nodes that perform database transactions for a database system, and wherein the first coordinator node is one of a plurality of coordinator nodes that is operable to ensure transactional consistency for database transactions;

determining to relocate at least a portion of the replica to a second coordinator node;

copying the portion of the replica to the second coordinator node;

during the copying, receiving, from multiple worker nodes of the plurality of worker nodes, requests to grant a lock for a key that permits a worker node to write a record for the key as part of executing a database transaction, wherein the multiple worker nodes are operable to send requests to the second coordinator node to grant the lock; and sending an approval response for the lock to at most one of the multiple worker nodes, wherein a single one of the multiple worker nodes acquires the lock in response to receiving approval responses from a majority of a quorum having ones of the plurality of coordinator nodes and the second coordinator node.

15. The system of claim 14, wherein the operations further comprise:

performing a split operation on the replica to logically split the replica into two or more replicas corresponding to two or more subpartitions that represent a splitting of the data partition, wherein the portion corresponds to one of the two or more replicas.

16. The system of claim 14, wherein the operations further comprise:

receiving a different replica from a different coordinator node of the database system; and performing a merge operation to logically merge the replica and the different replica into a single replica corresponding to a single data partition.

17. The system of claim 14, wherein the operations further comprise:

receiving a different replica from a different coordinator node of the database system; and while information of the different replica is being received, process requests from ones of the plurality of worker nodes, wherein processing at least one of the requests includes storing a lock in the different replica that is granted in association with the at least one request.

18. The system of claim 14, wherein the operations further comprise:

removing committed records from the replica based on committed records associated with the replica being persisted in a persistent store.

* * * * *